United States Patent
Mashinsky et al.

(10) Patent No.: US 7,751,548 B1
(45) Date of Patent: Jul. 6, 2010

(54) SYSTEM AND METHOD FOR FACILITATING TARGETED MARKETING OVER A TELECOMMUNICATIONS NETWORK

(75) Inventors: Alex Mashinsky, New York, NY (US); Jeff Parness, New York, NY (US)

(73) Assignee: Alex Mashinsky Family Trust, Memphis, TN (US)

( * ) Notice: Subject to any disclaimer, the term of this patent is extended or adjusted under 35 U.S.C. 154(b) by 984 days.

(21) Appl. No.: 10/098,667

(22) Filed: Mar. 15, 2002

Related U.S. Application Data

(60) Provisional application No. 60/276,288, filed on Mar. 15, 2001.

(51) Int. Cl.
*H04M 7/00* (2006.01)
*H04M 11/00* (2006.01)
*H04L 12/66* (2006.01)

(52) U.S. Cl. .............................. 379/221.01; 379/93.12; 370/352

(58) Field of Classification Search .............. 379/93.12, 379/114.24, 211.02, 221.01, 901; 370/352
See application file for complete search history.

(56) References Cited

U.S. PATENT DOCUMENTS

| | | | |
|---|---|---|---|
| 4,757,267 A * | 7/1988 | Riskin | 379/114.24 |
| 5,136,636 A * | 8/1992 | Wegrzynowicz | 379/221.01 |
| 5,291,550 A * | 3/1994 | Levy et al. | 379/242 |
| 5,588,048 A * | 12/1996 | Neville | 379/127.01 |
| 5,805,688 A * | 9/1998 | Gillespie et al. | 379/221.08 |
| 5,884,277 A * | 3/1999 | Khosla | 705/14 |
| 6,222,919 B1 * | 4/2001 | Hollatz et al. | 379/265.12 |
| 6,282,563 B1 * | 8/2001 | Yamamoto et al. | 709/202 |
| 6,404,875 B2 * | 6/2002 | Malik et al. | 379/211.03 |
| 6,404,877 B1 * | 6/2002 | Bolduc et al. | 379/218.01 |
| 6,411,699 B1 * | 6/2002 | Fleischer et al. | 379/211.02 |
| 6,999,574 B2 * | 2/2006 | Baker | 379/218.01 |
| 2002/0087401 A1 | 7/2002 | Leapman et al. | |
| 2002/0161689 A1* | 10/2002 | Segal | 705/37 |
| 2004/0109547 A1 | 6/2004 | Katz | |
| 2005/0002510 A1 | 1/2005 | Elsey et al. | |
| 2008/0120186 A1* | 5/2008 | Jokinen et al. | 705/14 |

* cited by examiner

*Primary Examiner*—Rasha S Al Aubaidi
(74) *Attorney, Agent, or Firm*—Cohen Pontani Lieberman & Pavane LLP

(57) ABSTRACT

A method and system for facilitating targeted marketing over a telecommunications network that includes a central controller which receives a data request from an originating party to a terminating party. The identity of the terminating party is established and targeted marketing material, for example, a coupon for the terminating party or a competitor of the terminating party, is offered to the originating party.

12 Claims, 5 Drawing Sheets

Figure 2

| IDENTIFIER | TERMINATING PARTY |
|---|---|
| ABC.555.1234 | XYZ COMPUTER |
| 800.555.5555 | HAPPY SKIES AIRLINE |
| 800.ABD.8901 | GREEN GROCER |

Figure 3

| COMPANY: XYC COMPUTER | |
|---|---|
| RELATED IDENTIFIERS: | 800.555.5555  800.555.9874<br>800.555.1236  800.555.7412<br>800.555.4587  800.555.1265 |
| COUPON ID | COUPON |
| C00-001 | $5 OFF NEW LAPTOP CARRYING CASE AT ABC COMPUTER |
| C00-002 | FREE MONTH SUBSCRIPTION TO INTERNET SERVICE PROVIDER BRAND XXX |

| COMPANY: HAPPY SKIES AIRLINE | |
|---|---|
| RELATED IDENTIFIERS: | 800.555.7896  800.555.8523<br>800.555.1596  800.555.3698<br>800.555.6547  800.555.1265 |
| COUPON ID | COUPON |
| C05-001 | 10% DISCOUNT AT SAFE SKIES AIRLINE |
| C05-002 | HALF-PRICED RENTAL CAR FROM RELIABLE RENTALS |

Figure 4

| ANI / IP ADDRESS | CONTACT INFORMATION | ORIGINATING PARTY CONTACT | TARGETED MARKETING |
|---|---|---|---|
| (212) 555-2565 | 800.555.1234 | JIM@AOL.COM | C05-001<br>C05-002 |
| 128.45.230.789 | www.abc.com | JOE@YAHOO.COM | C00-001<br>C00-002 |
| (440) 555-0582 | 800-555-9876 | RB85@HOTMAIL.COM | C12-032<br>C12-017 |
| 245.654.987.321 | 800-457-7896 | LISA@EXCITE.COM | C24-078 |

SYSTEM AND METHOD FOR FACILITATING TARGETED MARKETING OVER A TELECOMMUNICATIONS NETWORK

RELATED APPLICATIONS

This application claims priority from U.S. Provisional Application Ser. No. 60/276,288 filed Mar. 15, 2001.

FIELD OF THE INVENTION

The present invention relates generally to electronic data processing for business applications, and relates more particularly to the distribution or redemption of coupons, or other incentive or promotional programs.

DESCRIPTION OF THE RELATED ART

Merchants often have difficulty in targeting their marketing to relevant consumer segments. For example, one existing mass coupon distributor reports that it is paid on a per-coupon-distributed basis for their core product. As of March 2000, the company reported revenues of $350.9M. Its core domestic product generated $259.667M, or 74% of its revenue. With 165,000,000 customers a week, its reported revenue per customer was just $0.03 with approximate revenue per coupon of just $0.01 (assuming three coupons per customer).

The present invention addresses certain shortcomings in existing technologies for distribution of coupons.

SUMMARY OF THE INVENTION

According to certain embodiments of the present invention, a system and method for facilitating targeted marketing over a telecommunications network includes receiving a request (such as a toll free call) from an originating party to a terminating party, determining the identity of the terminating party, determining targeted marketing material based at least on the identity of the terminating party, and providing the targeted marketing material to the originating party.

These aspects and other objects, features, and advantages of the present invention are described in the following Detailed Description which is to be read in conjunction with the accompanying drawings.

BRIEF DESCRIPTION OF THE DRAWINGS

The invention will be described with reference to the accompanying figures, of which:

FIG. 2 is a representation of an exemplary directory database used by the central controller of FIG. 1;

FIG. 3 is a representation of an exemplary targeted marketing database used by the central controller of FIG. 1;

FIG. 4 is a representation of an exemplary request information database used by the central controller of FIG. 1.

DETAILED DESCRIPTION OF THE INVENTION

The present invention is a method and system for facilitating targeted marketing over a telecommunications network. The system includes a central controller that is capable of receiving data communication (such as voice communication, data (DNS), XML, Digital Object Identifiers (DOI), and/or the like) from an originating party to a terminating party. The identity of the terminating party is established and targeted marketing material (such as a coupon) for the terminating party or a competitor of the terminating party, is offered to the originating party.

In one example of the use of the present invention, a central controller functioning as a local data exchange may receive an information request (such as using a toll free phone call) from a customer to an airline booking and reservation center. In the process of transferring the request to the appropriate network service provider, the central controller determines the identity of the terminating party (such as the airline call center) by querying its own request directory database. Having determined the identity of the airline, the central controller next determines targeted marketing material based on the identity of the airline. In one exemplary embodiment, the targeted marketing material may be a coupon for a competing airline good for any national roundtrip ticket that is booked within the upcoming six months. The coupon is then provided to the customer, via any data communication means, such as via email, typical postal mail, the Internet, and/or the like.

Figure 1:
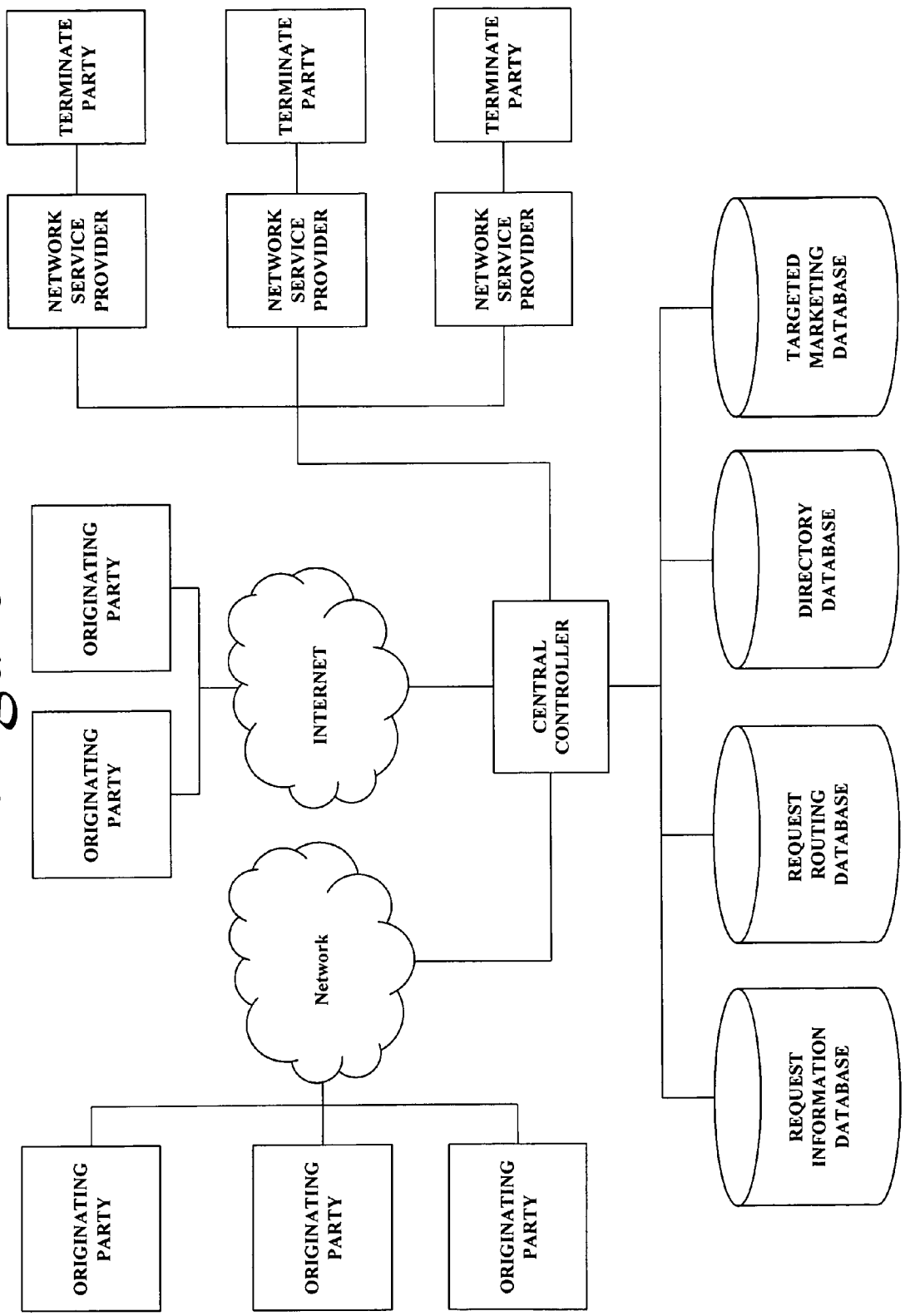
FIG. 1 is a schematic block diagram of an exemplary network for use with the present invention.

Referring to FIG. 1, the originating party 11 may be any entity capable of originating a request, such as a phone call or an Internet connection, in accordance with the invention. For example, the originating party 11 may be a consumer using his or her private telephone, or Internet account with a suitable Internet Service Provider (ISP).

The central controller 16 may be any entity capable of receiving, switching and transferring requests from one entity to another. For example, the central controller 16 may be a local exchange carrier, an ISP, an automated data manager, and/or the like.

Communication between the central controller 16 and the originating party 11 may take place over a dedicated network 12, or over the Internet 13 using any data transfer mechanism.

The network service provider 14 may be any entity capable of receiving and delivering a data request from the central controller 16 to a terminating party 15.

The terminating party 15 may be any entity capable of receiving a request from a network service provider 14. For example, the terminating party 15 may be a merchant or service provider such as an Airline registration center, a computer merchant's product sales center, and the like.

FIG. 2 is a tabular representation of the directory database 20 depicted in FIG. 1. The directory database may contain the following exemplary fields: an identifier field 21 storing a particular identifier and a terminating party field 22 for storing an identification of the party associated with the identifier.

FIG. 3 is a tabular representation of the targeted marketing database 30 depicted in FIG. 1. The targeted marketing database may contain the following exemplary fields: company field 31, company identifiers field 32, coupon identification (ID) field 33, coupon field 34 and/or the like.

The company field 31 stores information relating to the name of a company for which marketing information is available.

The related company identifier numbers field 32 stores the identifying information that may trigger the provisioning of marketing material related to the company, or a competitor of the company. For example, if the company is "DELL COMPUTER," one of the identifiers stored in this field 32 may be COMPAQ COMPUTER INC.'s toll free phone number, or the web page address of COMPAQ COMPUTER INC.

The coupon identification (ID) field 33 stores a unique coupon identifier associated with a coupon that may be provided on behalf of the company. In some embodiments of the invention, other forms of marketing material besides or in addition to coupons may be stored in this database 30.

The coupon field 34 stores information about the coupon identified by the coupon ID in field 33. For example, this field 34 may store the terms and conditions associated with the coupon.

FIG. 4 is a tabular representation of the request information database 40 depicted in FIG. 1. The request information database 40 may contain the following exemplary fields: optional date/time field (not shown), automatic number identification/Internet Protocol (ANI/IP) address field 41, contact information field 42, originating party contact field 43, targeted marketing field 44 and/or the like.

An optional date/time field (not shown) may store information related to the date and time at which the central controller 16 received the toll-free call from the originating party 11.

The automatic number identification/Internet Protocol (ANI/IP) address field 41 stores information related to the phone number or IP address of the device used by the originating party 11 to contact the central controller 16. In embodiments where the originating party 11 uses a phone to contact the central controller 16, this address field may store the phone number (or Billing Number) associated with the phone. In embodiments where the originating party 11 uses a device capable of initiating an Internet-based connection, this address field 41 may store the IP address of the device.

The contact information field 42 stores information related to the contact mechanism employed by the originating party.

The originating party contact field 43 stores contact information related to the originating party 11. For example, the originating party 11 may provide the central controller 16 with an e-mail address by spelling the email address over the phone. The central controller 16 may then record the spelling of the e-mail address and translate the voice recording into text using a speech recognition program.

The targeted marketing field 44 stores information related to the targeted marketing material provided to the originating party 11. For example, this field 44 may store the coupon ID associated with the coupon provided to the originating party 11 according to present invention.

It should be noted that the user information is collected related to the requests made and the requests may be made using appropriate search engines and other locations where users interact with networks by using devices, such as phone calls and file transfers. The identity and context of the destination is correlated to specific interest by the user which can be dramatically enhanced by the cross reference of such destinations to their Standard Industrial Classification (SIC) classification and/or their DOI product information.

All such transactions are pre-authorized by the users or subscribers to the search engine or other service providers and allow such service provider to provide targeted product and industry information to their customers as well as much more accurate search results since it has the context of the interests and industries of interest to which that specific user belongs and it can cross reference its responses to be prioritized by such historical information. Such systems can be used by corporate networks as well to build specialized knowledge nets with background profiles of employees and their interests.

Figure 5:
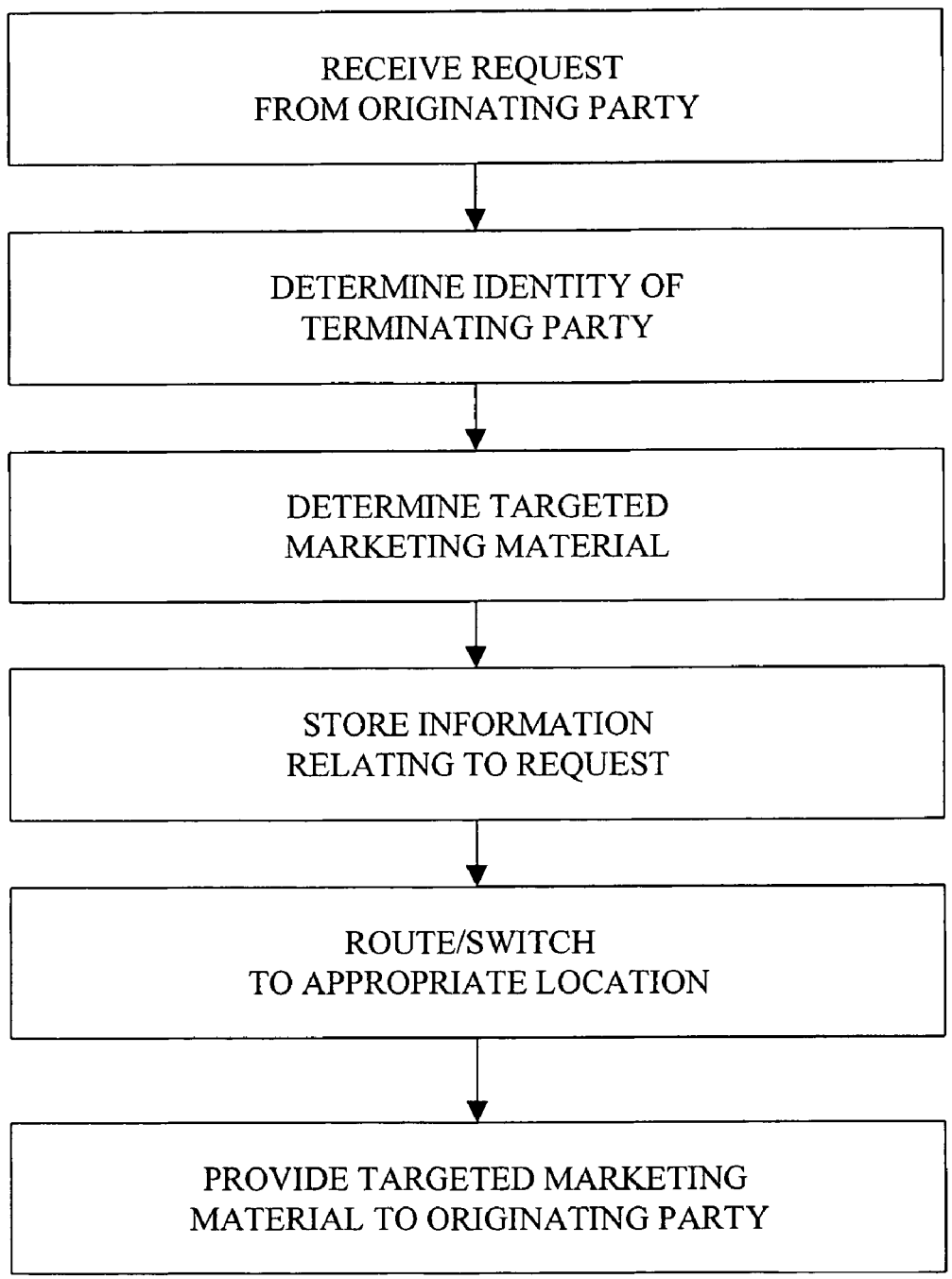
FIG. 5 is an exemplary method for facilitating targeted marketing over a network performed by the central server of FIG. 1.

FIG. 5 is a flow chart describing a method 50 performed by the central controller 16 according to the present invention.

At step 51, a connection request is received from the originating party 11. According to the present invention, the central controller 16 receives the connection request from an originating party 11 to a terminating party 15. The request may reach the central controller 16 from the PSTN (normal phone call), from the Internet, and the like.

Next, at step 52, the central controller 16 determines the identity of the terminating party 15 by querying the directory database 20 that stores information associating contact information with the identities of the parties.

Next, at step 53, based on the identity of the terminating party 15, the central controller 16 determines appropriate targeted marketing material to be provided to the originating party 11. For example, the targeted marketing database 30 may be accessed and queried using the identity of the terminating party 15.

Alternatively, or in addition thereto, the central controller 16 may use cookies, ANI, forwarded information from other sources (e.g. Web sites), voice recognition, and the like in determining targeted marketing material. For example, in a VoIP embodiment, the system may identify cookies stored on the originating parties computer and use the identity of those cookies in the determination of targeted marketing material. In another example, the originating party's IP address may be used to help determine targeted marketing material. The system may access a database that stores information linking a given IP address with Web sites visited by that address. Such information may be useful in determining targeted marketing material. In general, determining the identity of the originating party 11 may prove useful in determining targeted marketing material.

The method 50 may continue to step 54 where the central controller 16 may store information associated with the originating party 11, the terminating party 15, the targeted marketing material, and the like in the appropriate field of the information database 40. This information may be useful for various purposes, such as for billing purposes, to determine the effectiveness of the targeted marketing by tracking the originating parties future behavior, and/or the like.

Next, at step 55, the central controller 16 queries a routing database (not shown) in order to determine the network service provider associated with the toll-free number. The routing database may have fields correlating the dialed phone number to the network service provider, or the like. Based on the network service provider, the central controller 16 switches the call appropriately.

Finally, at step 56, having determined targeted marketing material, the central controller 16 then provides the material to the originating party 11. There are a number of ways whereby the targeted marketing material may be provided to the originating party.

In one embodiment, the originating party 11 may provide the central controller 16 with his or her e-mail address, and the central controller 16 may e-mail the targeted marketing material to the e-mail address. The e-mail address may be received before, during or after the initial request is made. For example, the originating party 11 may be informed before the request to the terminating party 15 that he or she should stay on the line after making the information request to receive the money saving coupons. At the end of the connection, the central controller 16 may sever the connection with the terminating party 15 and prompt the originating party 11 to enter his or her e-mail address into the communicating device, at which point the central controller 16 may record the originating party's response and analyze it using an appropriate software (such as a speech recognition program) in order to convert the entered response/data into computer-readable data. Alternatively, the originating party 11 may speak or enter their physical home address, and the central controller 16 may arrange for the targeted marketing material to be delivered to his or her home by first class mail or the like.

In another exemplary embodiment, before, during or after the call, the central controller 16 may issue the originating party 11 a code and notify the originating party 11 that he or she may enter the code at a specified Web site in order to receive the targeted marketing material. For example, an originating party 11 who calls DELTA AIRLINES may be given a code to enter into the AMERICAN AIRLINES Web site. By entering the code, the originating party 11 may receive a discounted fare for a specified flight.

In a VoIP embodiment, where the originating party 11 is utilizing, for example, a personal computer (PC), the targeted marketing material may be communicated to the originating party 11 via a pop-up window that appears on the monitor of the PC. Such a window may appear before, during or after the connection is completed.

In certain embodiments, the provision of targeted marketing material may include actually switching the originating party's call from one terminating party 15 to another. For example, a customer may make a connection to DELTA AIRLINE's reservation center only to find that the current hold time is 25 minutes. The central controller 16 may offer to switch the customer to UNITED AIRLINE's reservation center, which may have only a 5 minute hold time. In another embodiment, the central controller 16 may switch the call automatically. The central controller may receive a fee or the like from the new terminating party 15 for the redirected call.

What is claimed is:

1. A method for facilitating targeted marketing over a telecommunication network, comprising:
receiving at a processor a telephone call from an originating party, the telephone call including routing information for routing the telephone call to a called terminating party, wherein the routing information includes one of a telephone number and IP address of the called terminating party;
upon receipt of the telephone call, routing the telephone call by the processor to the called terminating party based on the routing information;
determining an identity of the called terminating party based on a query, which occurs at the processor, of a directory database that stores information associating the routing information with the identity of the called terminating party;
determining at the processor targeted marketing material based on the identity of the called terminating party;
providing the targeted marketing material to the originating party;
offering the originating party an option to contact a second terminating party within the specific industry or business category identical to the industry or business category of the called terminating party, and
switching the call of the originating party from the called terminating party to the second terminating party, when a current hold time of the called terminating party is a first predetermined number of minutes and the current hold time of the second terminating party is a second predetermined number of minutes that is substantially less than the first predetermined number of minutes.

2. The method of claim 1, wherein the telephone call is a toll-free telephone call.

3. The method of claim 1, further comprising:
identifying the originating party.

4. The method of claim 3, further comprising:
providing targeted marketing materials to the originating party based on characteristics associated with the identity of the originating party.

5. The method of claim 3, further comprising:
receiving a VoIP transaction from the originating party via a computer or wireless device;
identifying cookies or web site favorites as forming a part of the identity of the originating party;
determining targeted marketing materials based on the identity of the originating party; and
displaying the determined targeted marketing materials to the originating party on the computer or wireless device.

6. The method of claim 3, further comprising:
receiving a VoIP transaction from the originating party;
identifying a user-specific characteristic associated with an IP address of a computer or wireless device ID as forming a part of the identity of the originating party;
determining targeted marketing materials based on the identity of the originating party; and
displaying the targeted marketing materials to the originating party based on the user-specific characteristic associated with the IP address of the computer or wireless device ID of the originating party.

7. The method of claim 6, wherein the targeting marketing materials are displayed to the originating party one of before, during and after routing the telephone call from the originating party to the called terminating party.

8. The method of claim 3, wherein the targeted marketing materials are displayed to the originating party one of before, during and after routing the telephone call from the originating party to the called terminating party.

9. The method of claim 5, wherein the targeting marketing materials are displayed to the originating party at least one of before, during and after routing the telephone call from the originating party to the called terminating party.

10. The method of claim 1, wherein the targeted marketing material comprises a coupon.

11. The method of claim 10, wherein the coupon comprises a coupon for an airline ticket.

12. The method of claim 1 wherein the first predetermined number of minutes is approximately 25 minutes and the second predetermined number of minutes is approximately 5 minutes.

* * * * *